(12) United States Patent
Voloshin et al.

(10) Patent No.: US 7,061,931 B2
(45) Date of Patent: Jun. 13, 2006

(54) SYNCHRONOUS STACK BUS FOR FAST ETHERNET REPEATER

(75) Inventors: Moshe Voloshin, Sunnyvale, CA (US); Mark D. Cavaro, Sunol, CA (US)

(73) Assignee: Cisco Technology, Inc., San Jose, CA (US)

( * ) Notice: Subject to any disclaimer, the term of this patent is extended or adjusted under 35 U.S.C. 154(b) by 42 days.

(21) Appl. No.: 10/925,439

(22) Filed: Aug. 25, 2004

(65) Prior Publication Data

US 2005/0018704 A1 Jan. 27, 2005

Related U.S. Application Data

(63) Continuation of application No. 09/668,686, filed on Sep. 22, 2000, now Pat. No. 6,850,538.

(60) Provisional application No. 60/058,611, filed on Sep. 10, 1997, provisional application No. 60/062,391, filed on Oct. 7, 1997.

(51) Int. Cl.
*H04L 12/40* (2006.01)
*H04J 3/06* (2006.01)

(52) U.S. Cl. .................. 370/438; 370/445; 370/503
(58) Field of Classification Search ................ 370/438, 370/445, 503, 402, 501, 451; 340/825
See application file for complete search history.

(56) References Cited

U.S. PATENT DOCUMENTS

| | | |
|---|---|---|
| 5,432,913 A | 7/1995 | Smits et al. ................. 395/275 |
| 5,592,486 A | 1/1997 | Lo et al. ..................... 370/501 |
| 5,629,685 A | 5/1997 | Allen et al. ................. 340/438 |
| 5,636,214 A | 6/1997 | Kranzler et al. ............ 370/438 |
| 5,671,249 A | 9/1997 | Andersson et al. ......... 370/402 |
| 5,680,113 A * | 10/1997 | Allen et al. ............. 340/825.52 |
| 5,796,738 A | 8/1998 | Scott et al. .................. 370/401 |
| 5,805,596 A | 9/1998 | Kranzler et al. ............ 370/445 |
| 5,913,037 A | 6/1999 | Spofford et al. ........ 395/200.56 |
| 5,920,897 A | 7/1999 | Jin et al. ..................... 711/167 |
| 5,991,303 A | 11/1999 | Mills .......................... 370/402 |
| 5,999,295 A | 12/1999 | Vowell et al. .............. 359/152 |
| 6,023,476 A | 2/2000 | Lo .............................. 370/502 |
| 6,055,267 A | 4/2000 | Chiou ........................ 370/401 |
| 6,115,391 A | 9/2000 | Sokol ......................... 370/445 |
| 6,459,700 B1 * | 10/2002 | Hoang ........................ 370/401 |

OTHER PUBLICATIONS

Network Systems Tutorial for IEEE Std 802.3, Repeater Functions and System Design Topology Considerations for Carrier Sense Multiple Access with Collision Detection (CSMA/CD) Local Area Networks (LANs); Section 4, Repeater Functions, pp. 7-14 (1995).
International Standard ISO/IEC 8802-3: 1996(E) ANSI/IEEE Std 802.3, 1996 Edition; Carrier sense multiple access with collision detection (CSMA/DC) access method and physical layer specifications; Section 9, Repeater unit for 10 Mb/s baseband networks, pp. 125-155, 1996.

* cited by examiner

*Primary Examiner*—Andrew C. Lee
(74) *Attorney, Agent, or Firm*—Baker Botts L.L.P.

(57) ABSTRACT

Provided is a synchronous stack bus repeater system for a computer network. The system includes a plurality of stacked repeaters, a stack bus linking the repeaters, and a single clock to which the plurality of repeaters is synchronized. The synchronization of the stack bus eliminates several time-consuming communications required between devices operating with different clocks on an asynchronous bus and makes it possible to satisfy the 46 bit time repeater maximum latency required of a Class II repeater according to the IEEE 802.3 standard.

20 Claims, 4 Drawing Sheets

Max path: $T_{line,clk} + T_{buf4} + T_{clk4} + T_{clk->q4} + T_{line,data} + T_{su1} - T_{clk1} < 40000ps$
13680 + 4600 + 0 + 5600 + 11889 + 3000 - 0 = 38769ps

Max path: $T_{line,clk} + T_{buf4} + T_{clk4} + T_{clk\rightarrow q4} + T_{line,data} + T_{su1} - T_{clk1} < 40000 ps$ $13680 + 4600 + 0 + 5600 + 11889 + 3000 - 0 = 38769 ps$

FIG. 4

SYNCHRONOUS STACK BUS FOR FAST ETHERNET REPEATER

CROSS REFERENCE TO RELATED APPLICATIONS

This application is a continuation of U.S. application Ser. No. 09/668,686 filed Sep. 22, 2000, now U.S. Pat. No. 6,850,538 and entitled "Synchronous Stack Bus For Fast Ethernet Repeater," which claims priority to U.S. Provisional Patent Application Ser. No. 60/058,611 filed Sep. 10, 1997, and U.S. Provisional Patent Application Ser. No. 60/062,391, filed Oct. 7, 1997.

This application is related to co-pending U.S. patent application Ser. Nos. 08/965,330, 08/964,602, 08/964,601, 08/965,320, 08/965,460, and 08/965,323, which are incorporated herein by reference for all purposes.

BACKGROUND OF THE INVENTION

The present invention relates generally to network computing. In particular the present invention relates to methods and apparatuses for synchronizing a stack bus on a Fast Ethernet repeater stack.

The growth of local-area networks (LANs) has been driven by the introduction of Ethernet technology as well as the availability of powerful, affordable personal computers and workstations. As a result, applications that once were possible only on mainframe computers are now running on LANs. Network speed and availability are critical requirements. However, existing applications and a new generation of multimedia, groupware, imaging, and database products can tax a network running at Ethernet's traditional speed of 10 megabits per second (Mbps). Moreover, with more applications requiring faster LAN speeds for acceptable performance, network managers increasingly find that high-performance computation platforms and mission-critical applications can overwhelm a 10 Mbps network. Network managers therefore increasingly are implementing high-speed LAN technology.

Fast Ethernet

For organizations with existing Ethernet installations, increasing the network speed to 100 Mbps is preferable to investing in a completely new LAN technology. This user preference has driven the industry's decision to specify a higher-speed Ethernet that operates at 100 Mbps. This higher-speed Ethernet is known as Fast Ethernet.

In July 1993, a group of networking companies joined to form the Fast Ethernet Alliance. The charter of the group was to draft the 802.3u 100 BaseT specification of the Institute of Electrical and Electronics Engineers (IEEE) and to accelerate market acceptance of Fast Ethernet technology. The final IEEE 802.3 specification was approved in June 1995. Among the other goals of the Fast Ethernet Alliance are: To maintain the Ethernet transmission protocol Carrier Sense Multiple Access Collision Detection (CSMA/CD); to support popular cabling schemes; and to ensure that Fast Ethernet technology will not require changes to the upper-layer protocols and software that run on LAN workstations. For example, no changes are necessary to Simple Network Management Protocol (SNMP) management software or Management Information Bases (MIBs) in order to implement Fast Ethernet.

Other high-speed technologies, such as 100 VG-AnyLAN and Asynchronous Transfer Mode (ATM), achieve data rates in excess of 100 Mbps by implementing different protocols that require translation when data moves to and from 10 BaseT. Protocol translation requires changing the frame, which often causes delays in frame transmission through layer 2 (data-link layer) LAN switches. Data can move between Ethernet and Fast Ethernet, on the other hand, without requiring protocol translation or software changes, because Fast Ethernet maintains the 10 BaseT error control functions as well as the frame format and length.

In many cases, organizations can upgrade to 100 BaseT technology without replacing existing wiring. Options for 100 BaseT media are the same as those for 10 BaseT. They include shielded and unshielded twisted pair (STP and UTP) and fiber. The Media Independent Interface (MII) provides a single interface that can support external transceivers for any of the 100 BaseT physical sublayers.

CSMA/CD

Carrier sense-collision detection is widely used in LANs. Many vendors use this technique with Ethernet and the IEEE 802.3 specification. A carrier sense LAN considers all stations as peers; the stations contend for the use of the channel on an equal basis. Before transmitting, the stations monitor the channel to determine if the channel is active (that is, if another station is sending data on the channel). If the channel is idle, any station with data to transmit can send its traffic onto the channel. If the channel is occupied, the stations must defer to the station using the channel.

Figure 1:
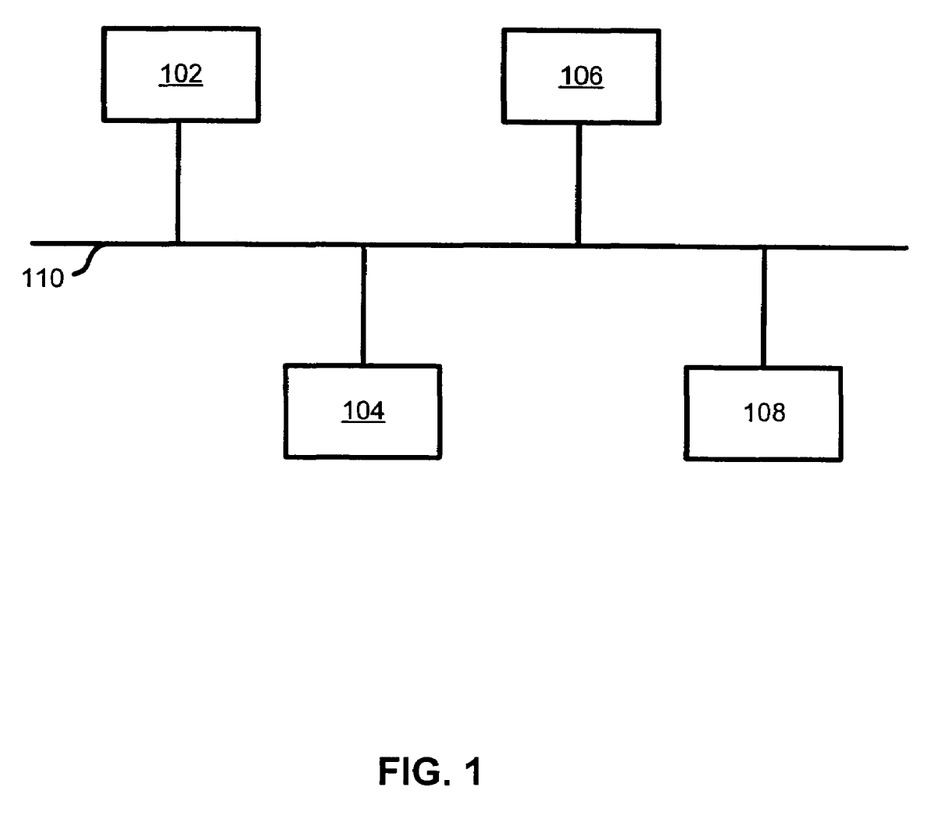
FIG. 1 depicts a carrier sense-collision detection local area network.

FIG. 1 depicts a carrier sense-collision detection LAN. Network devices 102, 104, 106, and 108 are attached to a network bus 110. Only one network device at a time is allowed to broadcast over the bus, since if more than one device were to broadcast at the same time, the combination of signals on the bus would likely not be intelligible. For example, assume network devices 102 and 104 want to transmit traffic. Network device 108, however, is currently using the channel, so network devices 102 and 104 must "listen" and defer to the signal from network device 108, which is occupying the bus. When the bus goes idle, network devices 102 and 104 can then attempt to acquire the bus to broadcast their messages.

Because network device 102's transmission requires time to propagate to other network devices, these other network devices might be unaware that network device 102's signal is on the channel. In this situation, network device 102 or 104 could transmit its traffic even if network device 108 had already seized the channel after detecting that the channel was idle. This problem is called the collision window. The collision window is a factor of the propagation delay of the signal and the distance between two competing stations. Propagation delay is the delay that occurs before a network device can detect that another network device is transmitting.

Each network device is capable of transmitting and listening to the channel simultaneously. When two network device signals collide, they create voltage irregularities on the channel, which are sensed by the colliding network devices. The network devices then turn off their transmission and, through an individually randomized wait period, attempt to seize the channel again. Randomized waiting decreases the chances of another collision because it is unlikely that the competing network devices generate the same wait time.

It is important that the total propagation delay not exceed the amount of time that is required to send the smallest size data frame. This allows devices to discard data corrupted by collisions by simply discarding all partial frames. It is therefore not desirable for entire frames of data to be sent before a collision is detected. Carrier sense networks are usually implemented on short-distance LANs because the collision window lengthens as the channel gets longer. Longer channels provide opportunity for the more collisions and can reduce through-put in the network. Generally, a long propagation delay coupled with short frames and high data transfer rates give rise to a greater incidence of collisions. Longer frames can mitigate the effect of long delay, but they reduce the opportunity for competing stations to acquire the channel.

The IEEE 802.3 specification sets a standard minimum frame size of 64 bytes (512 bits). Therefore, in order for a network to comply with the standard, a station on the network must not be able to transmit 64 bytes of data before a collision is detected.

Although Fast Ethernet maintains CSMA/CD, the Ethernet transmission protocol, it reduces the transmission time for each bit by a factor of 10. Thus, the Fast Ethernet signal speed increases tenfold, from 10 Mbps to 100 Mbps. Therefore, the propagation delay for each part of the network, also referred to as the part's "latency," must be reduced if the 64 byte 802.3 specification collision detection standard is to be satisfied. Latency is typically expressed in terms of bit time, or the amount of data that could be transmitted on the network during the period which it takes a signal to propagate through a network device.

Repeaters

While some Ethernet applications connect numerous network devices to a network bus that is literally a cable connecting the network devices, it is often more desirable to connect network devices using a repeater or hub. It should be noted that in the following description the term "hub" and the term "repeater" are used interchangeably. The repeater manages collision detection for the network devices so that the network devices need only broadcast messages without detecting collisions. The repeater notifies a network device when a collision occurs during its attempt to transmit. In addition, the repeater implements a star topology so that more devices can be included on the network without violating any cable length restriction and so that many devices can be added or removed from the network efficiently.

An Ethernet repeater is a device that serves as a central station for plugging-in network devices included in an Ethernet network, hence the term "hub." The Ethernet repeater receives messages from the network devices that are plugged into it and broadcasts (or "repeats") the message to all of the other devices on the network along a network bus, if no collision is detected. The repeater monitors network traffic in its collision domain and assumes the responsibility for collision detection. The network devices thus simply broadcast messages to the repeater and do not need to first listen before sending messages. If the repeater has already assigned the network bus to a device, then it notifies the device that tried to broadcast that a collision has occurred so that the network device may try again later. The amount of time that it takes for the repeater to receive a data signal and repeat that data signal out to every port on which the data signal is to be broadcast is referred to as the latency of the repeater.

The 802.3 specification contains maximum latency requirements that cannot be exceeded by a conforming repeater. The maximum permissible latency, combined with the requirements for maximum cable length and restrictions on the number and type of other devices allowed within a collision domain, limits the amount of time that it takes to notify a network device that a collision has occurred, ensuring that the overall 802.3 design criteria is met that all collisions are detected before a complete 64 byte frame is transmitted. If the maximum permissible latency were exceeded by a repeater, then multiple devices in the repeater's collision domain on an 802.3 Ethernet network might broadcast complete frames of data before being notified of a collision. As described above, the broadcast of complete frames when a collision occurs would defeat a scheme for discarding data associated with collisions by simply discarding all partial frames.

Thus, minimizing the latency of a repeater is critical if the repeater is to be implemented on a network in accordance with the 802.3 specification. The 100 BaseT standard defines two classes of repeaters: Class I and Class II. At most, a collision domain can include one Class I or two Class II repeaters. Including more than one repeater in a single collision domain is sometimes referred to as cascading repeaters. Specifically, in order to conform to the Class II requirement, the latency a repeater must be less than 46 bit times. It should be noted that the standard is expressed in terms of bit times, or the amount of data that could be transmitted on the network during the latency period.

Network Flexibility

The Class II requirement, which allows more than one repeater to be included in a single collision domain, significantly adds flexibility to network topology. Expanding the number of ports available on a network may be accomplished by simply adding a second repeater in the same collision domain as a single existing repeater. No switch is required. By limiting size of the network and the latency of the two repeaters, it is ensured that collisions can be detected and devices connected to different repeaters can be notified of collisions in time to stop sending data before a complete frame is broadcast, in accordance with the 802.3 specification.

Because networks tend to constantly change and expand with network devices being added, it would be highly advantageous if, in addition to the Class II feature of allowing two repeaters in a collision domain, it were also possible that each of the two repeaters were expandable or stackable. Additional ports could be added to a first repeater stack that functions as one Class II repeater and then a second stack could be included as the second Class II repeater. Thus, stackability combined with cascadability would provide even greater flexibility for network expansion.

Class II Repeater Latency

In order for a group or stack of repeaters to meet the stringent Class II latency requirements for a single repeater on a Fast Ethernet, a very high speed communications bus is needed for transferring information among the repeaters in the stack. Specifically, in order to conform to the Class II requirement, the total latency of all of the repeaters in the stack connected to the repeater stack bus must be less than 46 bit times. Previous attempts to develop a Class II Fast Ethernet stackable repeater which complies with the IEEE 802.3 standard have not been successful, and so only one such stack may currently be included in a single collision domain. Prior stacked repeater implementations have typically used asynchronous clocks.

Accordingly, there is a need for a stackable repeater that may be connected to a network along with another repeater stack to form a Class II-conforming stacked repeater Fast Ethernet. Moreover, it would be desirable if such a Class II repeater could be plugged into the network in a flexible manner so that individual repeater units in a stack could easily be connected and disconnected by a user.

SUMMARY OF THE INVENTION

To achieve the foregoing, the present invention provides a synchronous stack bus repeater system for a computer network. The system includes a plurality of stacked repeaters, a stack bus linking the repeaters, and a single clock to which the plurality of repeaters is synchronized. The synchronization of the stack bus eliminates several time-consuming communications required between devices operating with different clocks on an asynchronous bus and makes it possible to satisfy the 46 bit time repeater maximum latency required of a Class II repeater according to the IEEE 802.3 standard.

The stacked repeaters are preferably connected together with cables. This arrangement is particularly desirable because different repeaters can be plugged, unplugged, or exchanged by simply plugging and unplugging the cables. In contrast, an arrangement where repeaters plug directly into one another offers less convenience and flexibility. When stacked repeater units are reconfigured by changing the order in which the cables are plugged, repeaters on the end of the repeater stack synchronous bus may be moved to the middle of the bus or vice versa.

Since there is one clock source for all repeater units and all units send data on the stack bus synchronized to this clock in this stack bus architecture, there is no need to spend many cycles on synchronizing separate clocks from each unit as in a conventional stacked repeater system.

In order for synchronous operation of the stack to occur, the signal from the single clock must be able to propagate through the stack within one clock cycle. Therefore, a synchronous repeater stack according to a preferred embodiment of the present invention is designed to take this requirement into account by: Minimizing the length of the printed circuit board (PCB) traces and cabling on which the clock signal travels, matching the PCB trace and cable impedance, providing clock signal termination circuitry with matched impedance at each end of the stack bus, and a minimizing the capacitive load on each repeater board.

It should be appreciated that the present invention can be implemented in numerous ways, including as a process, an apparatus, a system, a device, a method, or a computer readable medium. Several inventive embodiments of the present invention are described below.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 2:
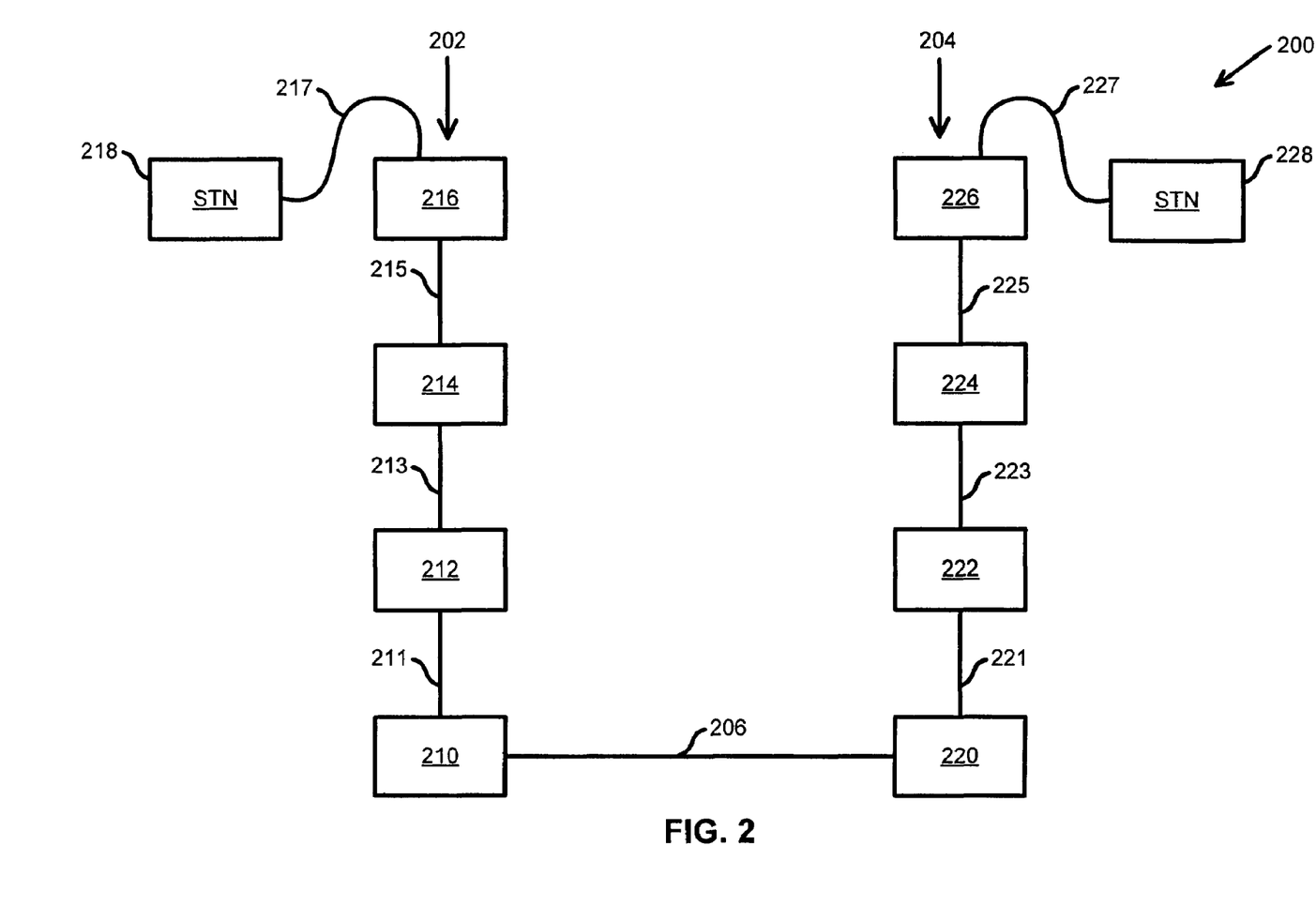
FIG. 2 depicts a block diagram of a Class II stacked repeater Fast Ethernet having two cascaded stacked repeaters according to a preferred embodiment of the present invention.

FIG. 2 depicts a block diagram of a Class II Fast Ethernet incorporating two cascaded stacked repeaters according to a preferred embodiment of the present invention. The network 200 includes cascaded repeater stacks 202 and 204 linked by a cable 206 which is capable of carrying data at least 100 Megabits per second (Mb/s). Suitable cable materials include shielded and unshielded twisted pair (STP and UTP) and fiber. The Class II standard provides that the cable 206 linking the two repeater stacks be 5 m long. Repeater stack 202 includes four individual cable-linked repeater units 210, 212, 214 and 216. Each of these units is capable of supporting two 16 port input/output (I/O) modules (not shown in this figure) and a management module (not shown in this figure). Therefore, stackability increases the number of ports available for connection of devices to the network from 32 to 128 for the stack 202. Similarly, repeater stack 204 includes four individual cable-linked repeater units 220, 222, 224 and 226, and provides the same expansion of available ports. Thus, the stacked repeaters 202 and 204 together may provide as many as 256 ports for connection of devices to the network 200 in a single collision domain.

In this preferred embodiment, the stacked repeaters are connected together with cables. This arrangement is particularly desirable because different repeaters can be plugged, unplugged, or exchanged by simply plugging and unplugging the cables. In contrast, an arrangement where repeaters plug directly into one another, such as where several PCB boards would be connected together within a single housing, offers less convenience and flexibility. In a cable-linked stacked repeater, the units may be quickly and easily reconfigured by changing the order in which the cables are plugged, so that repeaters on the end of the repeater stack synchronous bus may be moved to the middle of the bus or vice versa.

Referring to FIG. 2, repeater stack 202 includes a bottom repeater 210, two middle repeaters 212 and 214, and a top repeater 216. Each of the repeaters in the repeater stack 202 are connected to each other via a repeater stack bus that includes a stack bus connection cable 211 connected between repeater 210 and 212, a stack bus connection cable 213 connected between repeater 212 and 214, and a stack bus connection cable 215 connected between repeater 214 and 216. The repeaters in stack 204 are likewise connected by a repeater stack bus that includes a stack bus connection cable 221 connected between repeater 220 and 222, a stack bus connection cable 223 connected between repeater 222 and 224, and a stack bus connection cable 225 connected between repeater 224 and 226.

As described above, the IEEE 802.3 specification requires that when more than one station attempts to transmit data on a channel at the same time, a collision must be detected before a complete frame of data has been transmitted. The standard also sets the minimum frame size at 64 bytes. The two repeater stack buses of network 200 form part of a common collision domain channel for data traveling on the network. In order to satisfy the standard, a signal must be able to travel almost the entire length of the network 200 and back before a station can transmit 64 bytes of data. For example, in a worst case scenario, a device 218, such as a workstation, plugged-in to repeater 216 of stack 202 begins to transmit a frame of data on the channel. The data signal propagates along connection cable 217 to repeater 216. If the repeater 216 detects no traffic on stack 202's stack bus, it begins to broadcast device 218's signal on the stack 202's bus. The transmission signal is broadcast to all devices on the network. Its longest path is through both stacks 202 and 204 to a device 228 plugged-in to repeater 226 of stack 204. If, just before the signal reaches device 228, device 228 begins to transmit a frame of data on cable 227, the two signals are traveling on the channel at the same time and there is a collision. The signal indicating the collision must travel back through both stacks 204 and 202 to device 218 to tell it to stop transmitting. In order to comply with the standard, in the time it takes the signal to make this return trip, device 218 must not have transmitted a complete frame having a minimum size of 64 bytes.

Each part of the network has associated with it a latency being the time, typically expressed in bit time, that it takes a signal to propagate through that portion of the network. The IEEE 802.3 standard apportions a certain amount of the total allowable 64 byte time round trip propagation delay to each portion of the network. For a Class II repeater the maximum latency provided by the standard is 46 bit times. For the purposes of this latency calculation, stacks 202 and 204 are each considered a single repeater, and therefore each must satisfy the 46 bit time latency requirement.

Figure 3:
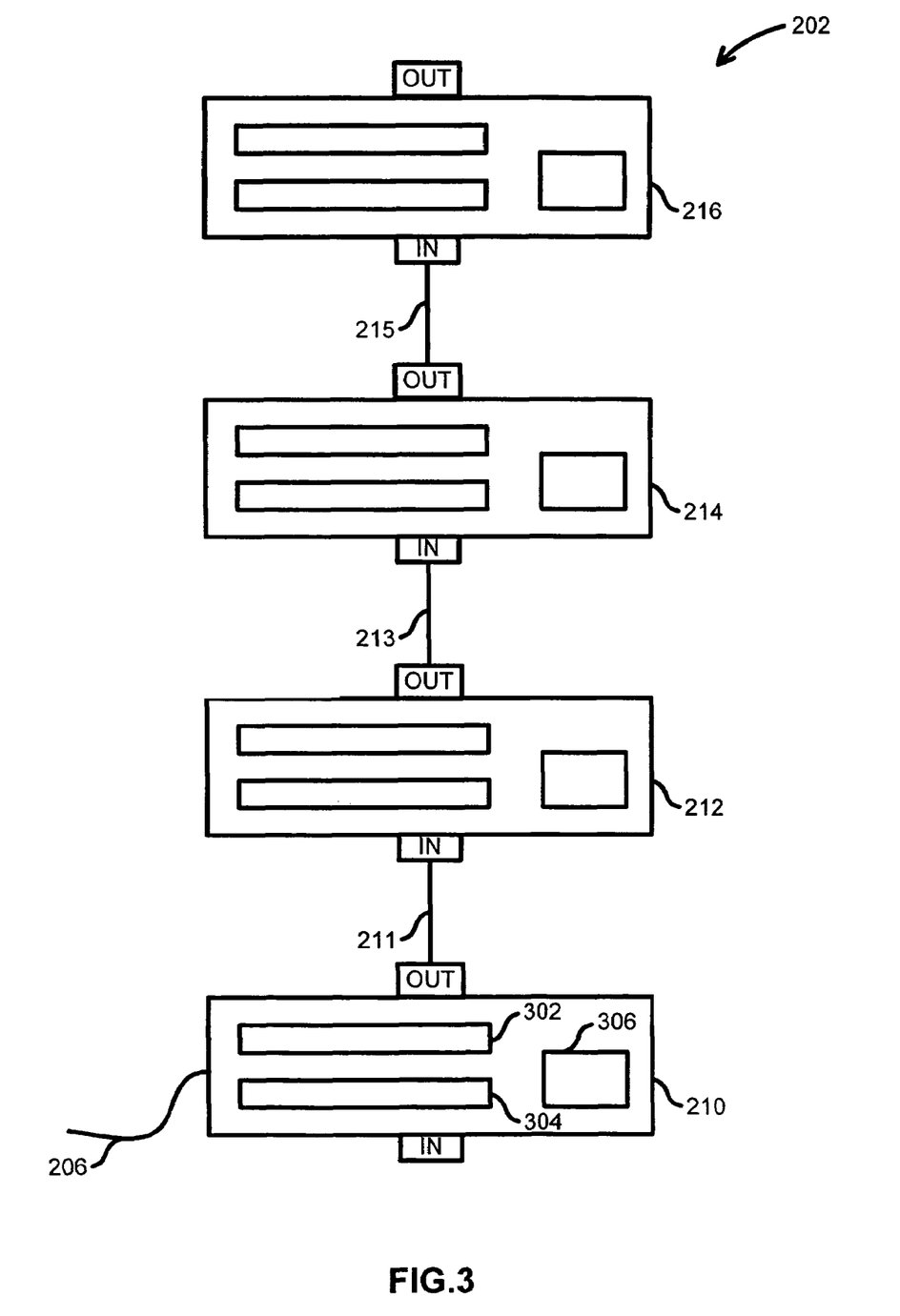
FIG. 3 depicts a simplified front view of a stacked repeater system in accordance with a preferred embodiment of the present invention showing the I/O and management modules.

FIG. 3 depicts a more detailed view of stack bus 202 showing the I/O and management modules in each repeater unit, for example I/O modules 302 and 304, and management module 306 in repeater unit 210. Each of the repeaters includes an input connector and an output connector. The output connector of each repeater in the stack is connected via a stack bus connection cable to the input connector of the repeater above it in the stack. It should be noted that in some embodiments the order of the repeater connectors may be changed. In fact, as noted above, it is an important advantage of this arrangement that the stack can be reconfigured and the repeaters reordered by simply plugging and unplugging the repeater bus cable. It should also be noted that the "in" and "out" designations for the connectors are relative and are intended to indicate complementarity.

Also shown in FIG. 3 are the cables connecting the stacked repeater units which contain the wiring for the stack bus, which provides the data path through the repeater stack 202, and a management bus to provide a communication link between the management modules of the stack 202. The structure and operation of the management bus is described in more detail in copending U.S. patent application Ser. No. 08/964,602, filed concurrently herewith and which has previously been incorporated by reference herein for all purposes. In order for the stack 202 to qualify as a Class II repeater, all the repeaters 210, 212, 214 and 216 in the stack 202 must be able to receive a data signal and repeat that data signal out to every port on the stack 202 on which the data signal is to be broadcast before 46 bits have been transmitted by a transmitting network device.

The stacked repeater 202 is able to achieve this Class II qualification in accordance with the present invention through the use of a single clock to which its stack bus is synchronized. Since there is one clock source for all repeater units and all units send data on the stack bus synchronized to this clock in this stack bus architecture, there is no need to spend many cycles on synchronizing separate clocks from each unit as in a conventional stacked repeater system. Therefore, this synchronized stack bus speeds the transmission of signals through the stack.

In order for synchronous operation of the stack to occur, the signal from the single clock must be able to propagate through the stack within one clock cycle. Therefore, a synchronous repeater stack according to a preferred embodiment of the present invention must be designed to take this requirement into account. For maximum speed and efficiency, the clock speed for an electronic apparatus should generally be set at the highest possible frequency compatible with the standard rate of data transmission through the apparatus. This is the natural frequency of the system. Thus, in a preferred embodiment, the present invention uses a 25 MHz clock which is based on the standard rate of data transmission for Fast Ethernet of 125 Mbaud. Data is transmitted in 5-baud symbols on Fast Ethernet. Each 5-baud symbol corresponds to the transmission of 4 bits of data per second. Therefore, the frequency of data transmission on the network is 125 Mbaud×(4 bits/s/5 baud)=100 Mbits per second (hence the "100" in 100 BaseT) and the actual frequency of the 4-bit portions of data being transmitted is 25 MHz. The reciprocal of 25 MHz provides the clock cycle of 40 ns.

The present invention is able to satisfy the Class II standard's requirement of a 46 bit time repeater latency while using a stacked repeater having as many as four units in the stack. The 46 bit time standard is met by using a high speed synchronized stack bus. In order to operate synchronously, all repeater units in the stack must be able to sample the data signals during each clock cycle. Therefore, this preferred embodiment of the present invention must be designed so that the round trip delay through the stack is within 40 ns.

In order for this 40 ns clock signal propagation requirement to be met in a properly functioning apparatus, a preferred embodiment of the present invention incorporates certain design features: The lengths of the printed circuit board (PCB) traces and cabling on which the clock signal travels through the stack bus are minimized, the PCB trace and cable impedance is matched, clock signal termination circuitry is provided with matched impedance at each end of the stack bus, and the capacitive load on each repeater board is minimized.

In one embodiment, a repeater stack has PCB traces (not shown in the figures) totaling no longer than about 2 to 2.5 inches. Therefore, for a stack having four repeaters, the total PCB trace length is limited to about 8 to 10 inches.

Similarly, the cables 211, 213 and 215 connecting the individual repeater units of the stack to each other are preferably about 15 inches long. A stack having four repeaters is connected together by 3 cables for a total of about 45 inches of cable in this embodiment.

In order for such a synchronous repeater stack bus to work properly and meet the Class II latency standard, in addition to keeping the length of the PCB traces and cables joining the repeater units to a minimum, it is necessary that the trace and cable impedance be substantially matched, and that the bus be terminated with a suitable impedance so that signals on the bus are not reflected as they travel along the bus or at the ends of the bus. In one embodiment, the impedance of the PCB traces may be about 68 Ω±20%, more preferably ±10%. The PC boards may be made out of polyamide or FR-4 type materials to give a relative dielectric constant of about 4.0. Such conditions produce a propagation delay of about 150 ps/inch. The trace impedance is preferably substantially matched to the cable impedance in order to avoid reflection of signals traveling on the bus. Cable of impedance of 68 Ω±10% (measured single-ended with the shield grounded and with one side of each wire pair grounded) may be used. Under these conditions, cable propagation delay will be about 125 to 133 ps/inch.

The repeater stack synchronous bus is also terminated at each end with a 2.5 V pull-up termination circuit with an impedance matched to about 68 Ω±5%. A relatively high voltage pull-up is preferred to grounding the termination circuit because it is more removed from the logic level transition threshold and makes the circuit less susceptible to noise. While repeaters on the ends of the bus must be terminated, repeaters in the middle of the bus must not be terminated or else they will block the signal from reaching the other repeaters on the bus. Termination is described more fully in copending U.S. patent application Ser. No. 08/965,330, filed concurrently herewith and previously incorporated by reference herein for all purposes.

Finally, the capacitive load on each repeater board should also be kept to a minimum, since too high a capacitance on a board may produce discontinuities and reflections in the propagating signal. The total capacitive load is a function of the number and capacitance of the input and output drivers connected to a trace forming part of the stack bus on each board. In one embodiment of the present invention, the clock line has two input drivers with a capacitance of about 5 pF each, and one output driver with a capacitance of about 7 pF, for a total capacitance of 17 pF. In addition, the board has two drivers for the data, an input driver having a capacitance of 5 pF and an output driver with a capacitance of 7 pF, for a total capacitance of 12 pF. One particularly preferred type of input and output drivers for implementation of this embodiment of the present invention are Advanced BiCMOS Technology drivers, available from a variety sources including Texas Instruments and Philips.

Figure 4:
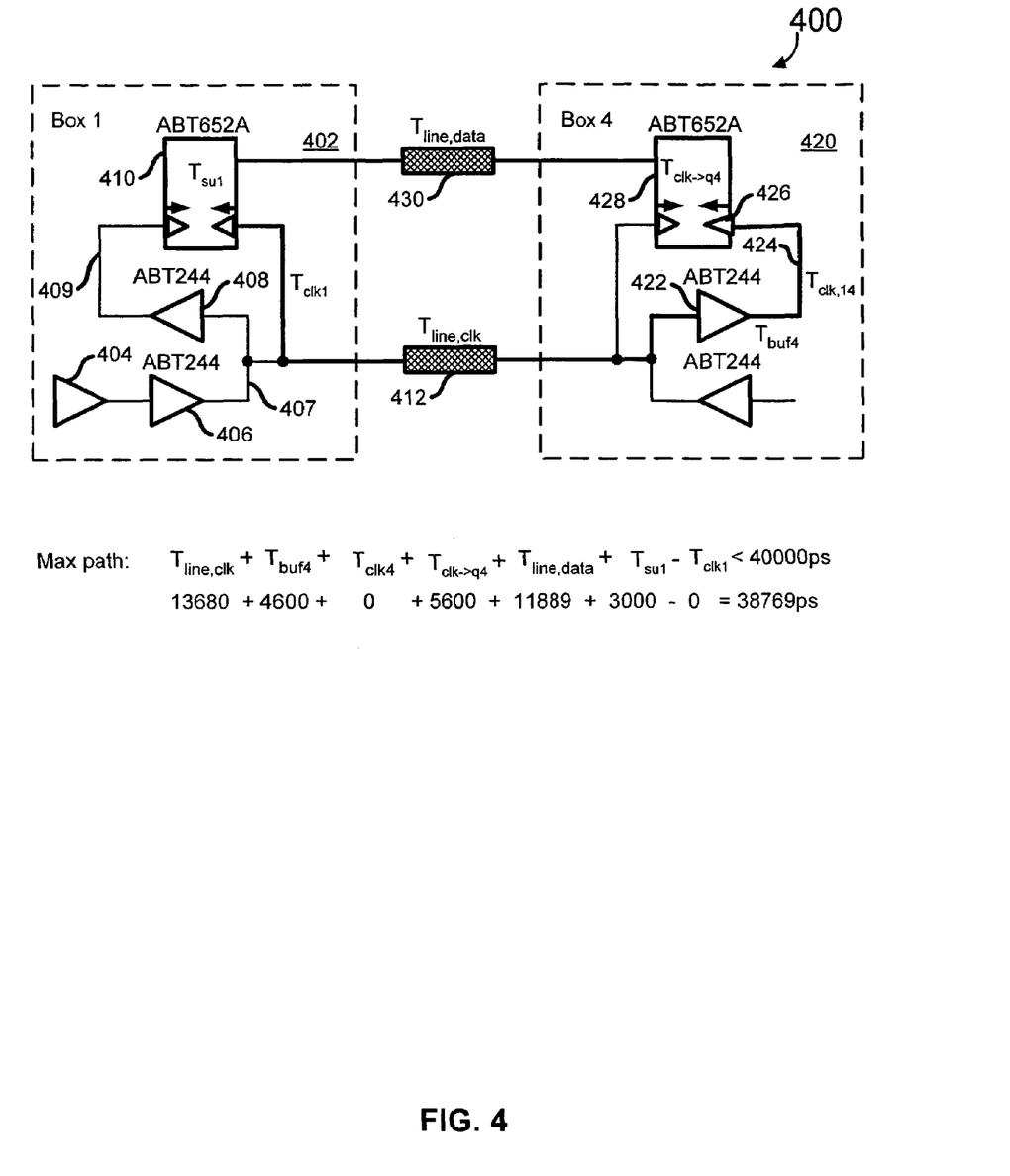
FIG. 4 shows a round trip timing path for a signal propagating through a synchronous cable-linked stacked repeater in accordance with a preferred embodiment of the present invention.

FIG. 4 shows a round trip timing path 400 for a signal propagating through a stack having a synchronous cable-linked stacked repeater implemented with the features described above, in accordance with a preferred embodiment of the present invention. The timing path shows the worst case scenario of the clock being driven off a repeater unit at one end of a stack (such as repeater 210 of stack 202 in FIGS. 2 and 3) and traveling to the repeater at the other end of the stack (such as repeater 216 of stack 202 in FIGS. 2 and 3) and the second unit uses the clock to drive the data back to the first unit which must then sample it using the same clock. The total travel time of the clock signal is made up of the component times it takes the clock signal to travel from the initiating PCB, through the cable to and through the other repeater unit, for the second unit to use the clock signal to send data through the cable back to the first unit, and for the first unit to use the clock to sample the data. This time must be less than 40 ns.

Referring to FIG. 4, the clock signal is initiated at a main clock input driver 404 on a first repeater unit 402 in a stack. The signal propagates through a local buffer composed of output driver 406 and input driver 408. Driver 408 sends the clock signal to a device 410 on the first repeater's board which uses the clock signal to perform its intended purpose. Driver 406 sends the clock signal along a PCB trace 407 and out of the first repeater 402 and onto the cable 412 connecting the repeaters. The signal then enters a local clock driver 422 (buffer) on the second unit 420. The local driver 422 strengthens the signal for local use. The strengthened signal then proceeds through a PCB trace 424 to a data output driver 426 in device 428 which then drives data out of the second repeater unit 220 to the stack bus 430 and back to the first repeater unit 402. After the data stabilizes in device 410, it is then read using the same clock.

The equation below the timing path shows the calculation of the propagation delay for the maximum path. $T_{line,clk}$ represents the propagation delay from the cable 412, which is equal to about 13680 ps. $T_{buf4}$ represents the delay from the buffer 422 on unit 420, which is equal to about 4600 ps. $T_{clk4}$ represents the trace propagation delay, which is about 0. $T_{clk->q4}$ represents the time taken from the rising of the local clock signal to the time the data goes out of the second unit 420 onto the stack bus 430, which equals about 5600 ps. $T_{line,data}$ represents the time taken to go through the stack bus 430 back to the first unit 402, which equals about 11889 ps. $T_{su1}$ represents the set-up time, that is the time required for the data to stabilize before the data is sampled by the clock, which equals about 3000 ps. Finally, $T_{clk1}$ represents the time taken for the clock signal to travel through a PCB trace 409 on the board of the first unit 402 to device 410 where the data is sampled, which is about 0. The times are all summed, except for the $T_{clk1}$ which is subtracted since it actually shortens the timing path, to total 38,769 ps. This total, which represents the statistically extremely unlikely situation which produces the worst possible outcome based on distance of travel and ambient conditions, is still less than 40 ns (40000 ps), as required for successful synchronous operation of the stack bus.

While the present invention has been described mainly in terms of a 100 BaseT Fast Ethernet environment, it should also be noted that advances continue to be made in networking technology which make even faster data transmission possible. The present invention may also be applicable to these emerging technologies, such as Gigabit per second data transmission rates.

Although the foregoing invention has been described in some detail for purposes of clarity of understanding, it will be apparent that certain changes and modifications may be practiced within the scope of the appended claims. It should be noted that there are may alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for providing Ethernet communications, comprising:
   generating a clock signal that is capable of propagating through a plurality of stacked repeaters within one clock cycle; and providing a data input driver and a data output driver in each of one or more of the stacked repeaters, wherein the drivers are capable of assisting in propagation of a signal through the repeaters.

2. The method of claim 1, further comprising:
linking one or more of the repeaters together in order to facilitate a data flow.

3. The method of claim 2, further comprising:
providing traces on a printed circuit board of one or more of the repeaters in order to carry one or more electrical signals.

4. The method of claim 3, further comprising:
matching, substantially, an impedance of the printed circuit board and an impedance of one or more cables coupled to one or more of the repeaters.

5. The method of claim 4, wherein the impedance of the printed circuit board is about 68 Ω±20% and the impedance of the cables is about 68 Ω±10%.

6. The method of claim 5, further comprising:
terminating a stack bus, which links one or more of the repeaters, at each end with a 2.5 V pull-up termination circuit with an impedance matched to about 68 Ω±5%.

7. The method of claim 1, further comprising:
cascading one or more of the repeaters; and
coupling the cascaded repeaters such that data can flow through the cascaded repeaters.

8. The method of claim 1, wherein one or more of the repeaters are coupled by a cable that is operable to facilitate a data flow.

9. The method of claim 1, wherein one or more of the repeaters are operable to sample data during the clock cycle.

10. The method of the claim 1, wherein one or more of the repeaters are coupled to a printed circuit board that includes a capacitive load that is a function of capacitances associated with the data input driver and the data output driver.

11. A system for providing Ethernet communications, comprising:
means for generating a clock signal that is capable of propagating through a plurality of stacked repeaters within one clock cycle; and
means for configuring a data input driver and a data output driver in each of one or more of the stacked repeaters, wherein the drivers are capable of assisting in propagation of a signal through the repeaters.

12. The system of claim 11, further comprising:
means for linking one or more of the repeaters together in order to facilitate propagation of a data flow.

13. The system of claim 11, further comprising:
means for matching, substantially, an impedance of a printed circuit board and an impedance of one or more cables coupled to one or more of the repeaters.

14. The system of claim 11, further comprising:
means for terminating a stack bus, which links one or more of the repeaters, at each end.

15. The system of claim 11, further comprising:
means for cascading one or more of the repeaters; and
means for coupling the cascaded repeaters such that data can flow through the cascaded repeaters.

16. Software for providing Ethernet communications, the software being embodied in a computer readable medium and comprising computer code such that when executed is operable to:
generate a clock signal that is capable of propagating through a plurality of stacked repeaters within one clock cycle; and
provide a data input driver and a data output driver in each of one or more of the stacked repeaters, wherein the drivers are capable of assisting in propagation of a signal through the repeaters.

17. The medium of claim 16, wherein the code is further operable to:
link one or more of the repeaters together in order to facilitate a data flow.

18. The medium of claim 16, wherein the code is further operable to:
match, substantially, an impedance of the printed circuit board and an impedance of one or more cables coupled to one or more of the repeaters.

19. The medium of claim 16, wherein the code is further operable to:
terminate a stack bus, which links one or more of the repeaters, at each end with a 2.5 V pull-up termination circuit with an impedance matched to about 68 Ω±5%.

20. The medium of claim 16, wherein the code is further operable to:
configure one or more of the repeaters in order to sample data during the clock cycle.

* * * * *